(12) United States Patent
Bae et al.

(10) Patent No.: US 8,540,258 B2
(45) Date of Patent: Sep. 24, 2013

(54) RACK ASSIST TYPE ELECTRIC POWER STEERING APPARATUS

(75) Inventors: Hong Yong Bae, Yongin-si (KR); Joo Namgung, Wonju-si (KR); Hee Kwon Jo, Wonju-si (KR)

(73) Assignee: Mando Corporation, Pyeongtaek-Si (KR)

( * ) Notice: Subject to any disclaimer, the term of this patent is extended or adjusted under 35 U.S.C. 154(b) by 160 days.

(21) Appl. No.: 12/956,837

(22) Filed: Nov. 30, 2010

(65) Prior Publication Data

US 2011/0127742 A1 Jun. 2, 2011

(30) Foreign Application Priority Data

Nov. 30, 2009 (KR) .......................... 10-2009-0117184
Nov. 19, 2010 (KR) .......................... 10-2010-0115596

(51) Int. Cl.
*B62D 7/22* (2006.01)
(52) U.S. Cl.
CPC ...................................... *B62D 7/226* (2013.01)
USPC ........ 280/93.515; 180/444; 384/536; 384/582
(58) Field of Classification Search
USPC ................. 180/443, 444, 446; 384/536, 582; 280/93.515
See application file for complete search history.

(56) References Cited

U.S. PATENT DOCUMENTS

| | | | | |
|---|---|---|---|---|
| 1,434,855 | A * | 11/1922 | Stamm et al. ................. | 384/536 |
| 2,062,290 | A * | 12/1936 | Bott .............................. | 384/536 |
| 2,165,155 | A * | 7/1939 | Schmal ......................... | 384/536 |
| 2,173,250 | A * | 9/1939 | Fay .............................. | 384/536 |
| 2,414,335 | A * | 1/1947 | Schroeder .................... | 384/536 |
| 2,674,505 | A * | 4/1954 | Pfenninger, Jr. et al. ..... | 384/536 |
| 2,733,108 | A * | 1/1956 | Cowles ......................... | 384/582 |
| 3,053,591 | A * | 9/1962 | Bensch et al. ................ | 384/581 |
| 3,093,427 | A * | 6/1963 | Vasta ............................ | 384/536 |
| 3,415,500 | A * | 12/1968 | Pethis ............................ | 261/29 |
| 3,447,846 | A * | 6/1969 | Marsh .......................... | 384/536 |
| 3,604,545 | A * | 9/1971 | Bourgeois ..................... | 192/98 |
| 3,704,922 | A * | 12/1972 | Kleinschmidt et al. ....... | 384/582 |
| 3,743,365 | A * | 7/1973 | Kato ............................. | 384/536 |
| 3,876,266 | A * | 4/1975 | Rozentals ..................... | 384/536 |
| 4,229,055 | A * | 10/1980 | Olschewski et al. .......... | 384/536 |
| 4,696,587 | A * | 9/1987 | Nishida et al. ................ | 384/536 |
| 5,044,785 | A * | 9/1991 | Bair et al. ..................... | 384/536 |
| 5,062,721 | A * | 11/1991 | Chiba ........................... | 384/536 |
| 5,247,855 | A * | 9/1993 | Alten et al. ................... | 74/606 R |
| 5,632,562 | A * | 5/1997 | Kidzun et al. ................ | 384/536 |
| 6,044,723 | A * | 4/2000 | Eda et al. .................... | 74/388 PS |
| 6,149,382 | A * | 11/2000 | Englander et al. ............ | 415/90 |
| 6,482,140 | B1 * | 11/2002 | Takatsu ........................ | 492/31 |
| 6,536,953 | B1 * | 3/2003 | Cope et al. .................. | 384/536 |
| 6,942,451 | B1 * | 9/2005 | Alexander et al. ............ | 415/119 |
| 7,223,020 | B2 * | 5/2007 | Bauer et al. ................... | 384/535 |
| 7,488,111 | B2 * | 2/2009 | Chen et al. ................... | 384/536 |
| 7,637,667 | B1 * | 12/2009 | Schaub ......................... | 384/536 |

(Continued)

*Primary Examiner* — Paul N Dickson
*Assistant Examiner* — Maurice Williams
(74) *Attorney, Agent, or Firm* — McDermott Will & Emery LLP

(57) ABSTRACT

A rack-assist type electric power steering apparatus, in which when a ball nut slides a rack bar while rotating, a vibration and a noise in the axis direction and the radial direction, generated from the rack bar and a rack housing, are absorbed. This facilitates the operation of the ball nut and the rack bar, and reduces the vibration and the noise, thereby resulting in an effect for providing a comfortable steering feeling to a driver.

6 Claims, 13 Drawing Sheets

(56) References Cited

U.S. PATENT DOCUMENTS

| | | | |
|---|---|---|---|
| 7,777,379 B2* | 8/2010 | Schulz | 310/90 |
| 8,042,645 B2* | 10/2011 | Kurokawa | 180/444 |
| 2002/0081047 A1* | 6/2002 | Zoppitelli et al. | 384/495 |
| 2005/0205342 A1* | 9/2005 | Tatewaki et al. | 180/444 |
| 2005/0232525 A1* | 10/2005 | Faust et al. | 384/535 |
| 2006/0182378 A1* | 8/2006 | Chen et al. | 384/536 |
| 2007/0187169 A1* | 8/2007 | Sasaki et al. | 180/444 |
| 2007/0217725 A1* | 9/2007 | Budaker et al. | 384/536 |
| 2007/0227804 A1* | 10/2007 | Fukuda et al. | 180/444 |

* cited by examiner

RACK ASSIST TYPE ELECTRIC POWER STEERING APPARATUS

CROSS-REFERENCE TO RELATED APPLICATION

This application claims priority from and the benefit of Korean Patent Application No. 10-2009-0117184, filed on Nov. 30, 2009 and Korean Patent Application No. 10-2010-0115596, filed on Nov. 19, 2010, which are hereby incorporated by reference for all purposes as if fully set forth herein.

BACKGROUND OF THE INVENTION

1. Field of the Invention

The present invention relates to a rack-assist type electric power steering apparatus, and more particularly to a rack-assist type electric power steering apparatus, in which when a ball nut slides a rack bar while rotating, a vibration and a noise in the axis direction and the radial direction generated from the rack bar and a rack housing are absorbed, thereby facilitating the operation of the ball nut and the rack bar, reducing the vibration and the noise, and providing a comfortable steering feeling to a driver.

2. Description of the Prior Art

In general, as an electric power steering apparatus for a vehicle, a hydraulic power steering apparatus using oil pressure of a hydraulic pump is used. However, an electric power steering apparatus using a motor has recently gradually been universalized.

A general electric power steering apparatus includes a steering system extending from a steering wheel to both side wheels 126, and an auxiliary power mechanism for supplying auxiliary steering power to the steering system.

The auxiliary power mechanism includes a torque sensor, an electronic control unit (ECU), a motor, and a belt-type transmission device. The torque sensor senses a steering torque applied to the steering wheel by a driver, and outputs an electrical signal in proportion to the sensed steering torque. The ECU generates a control signal based on the electrical signal transferred from the torque sensor. The motor generates auxiliary steering power based on the control signal transferred from the ECU. The belt-type transmission device transfers the auxiliary power generated by the motor to a rack bar through a belt.

FIG. 1 is a partial cross-sectional view schematically illustrating a conventional rack-assist type electric power steering apparatus, and FIG. 2 is a cross-sectional view schematically illustrating a part of a conventional rack-assist type electric power steering apparatus.

As shown in FIGS. 1 and 2, the conventional rack-assist type electric power steering apparatus includes a rack bar 140, a pinion shaft 110, a ball nut 210, a belt-type transmission device 160 and a motor 150. The rack bar 140 extends in the vertical direction of a vehicle, and is provided with a rack gear at one side of the outer circumferential surface thereof. The pinion shaft 110 is provided with a pinion gear engaged with the rack gear. The ball nut 210 is engaged with an outer circumferential screw thread 145 through a ball 220. The belt-type transmission device 160 connects the ball nut 210 to a motor shaft 155.

The pinion shaft 110 is connected to a steering wheel through a steering shaft, and the rack bar 140, provided with the outer circumferential screw thread 145 with a predetermined length at one side of the outer circumferential surface thereof, is embedded in a rack housing 120.

The belt-type transmission device 160 includes a belt connecting the ball nut 210 to the motor shaft 155, and transfers the auxiliary steering power generated by the motor 150 to the rack bar 140 through the ball nut 210 in proportion to the steering torque applied to the steering wheel.

As shown in FIG. 2, the conventional rack-assist type electric power steering apparatus includes the rack bar 140, the ball nut 210, the ball 220, an end cap 230, and the like. The rack bar 140 is provided with the outer circumferential screw thread 145 at the outer circumferential surface thereof. The ball nut 210 is provided with an intermediate path 215 for circulating the ball 220. The ball 220 rolls while coming in contact with the outer circumferential screw thread 145 of the rack bar, and the intermediate path 215. The end cap 230 is attached with the end of the ball nut 210.

In such a rack-assist type electric power steering apparatus, the ball 220 rolls while coming in contact with the outer circumferential screw thread 145 of the rack bar 140, and an inner circumferential screw thread of the ball nut 210, which slides the rack bar 140.

However, such a conventional rack-assist type electric power steering apparatus has a problem in that when the ball nut slides the rack bar by rotating, a noise and a vibration are generated through the rack bar and the rack housing. Furthermore, there is a problem in that such a noise and vibration are transferred to a driver together with other components, thereby reducing the steering feeling of the driver.

SUMMARY OF THE INVENTION

Accordingly, the present invention has been made to solve the above-mentioned problems occurring in the prior art, and the present invention provides a rack-assist type electric power steering apparatus, in which when a ball nut slides a rack bar while rotating, a vibration and a noise in the axis direction and the radial direction generated from the rack bar and a rack housing are absorbed, thereby facilitating the operation of the ball nut and the rack bar, reducing the vibration and the noise, and providing a comfortable steering feeling to a driver.

In order to accomplish this object, there is provided a rack-assist type electric power steering apparatus including: a ball nut which is rotated while being combined with a rack bar through a ball, thereby sliding the rack bar; a bearing which is mounted on an outer circumferential surface of the ball nut to support rotation; a connecting ring combined between an outer wheel of the bearing and a rack housing; and an axial damper which is combined at both sides of the connecting ring and is provided with lateral side projections protruding in a direction of a central axis of the rack bar, wherein the lateral side projections include a number of first side projections, and a number of second side projections.

In accordance with another aspect of the present invention, there is provided a rack-assist type electric power steering apparatus including: a ball nut which is rotated while being combined with a rack bar through a ball, thereby sliding the rack bar; a bearing which is mounted on an outer circumferential surface of the ball nut to support rotation; a connecting ring combined between an outer wheel of the bearing and a rack housing; and a radial damper which is combined between an outer circumferential surface of the connecting ring and the rack housing.

In accordance with a further aspect of the present invention, there is provided a rack-assist type electric power steering apparatus including: a ball nut which is rotated while being combined with a rack bar through a ball, thereby sliding the rack bar; a bearing which is mounted on an outer circumferential surface of the ball nut to support rotation; and a housing damper combined between an outer wheel of the bearing and a rack housing to absorb a vibration and a noise in an axis direction and a radial direction of the rack bar.

According to the present invention, when a ball nut slides a rack bar while rotating, a vibration and a noise in the axis direction and the radial direction, generated from the rack bar and a rack housing, are absorbed by a damper. This facilitates the operation of the ball nut and the rack bar, and reduces the vibration and the noise, thereby resulting in an effect for providing comfortable steering feeling to a driver.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
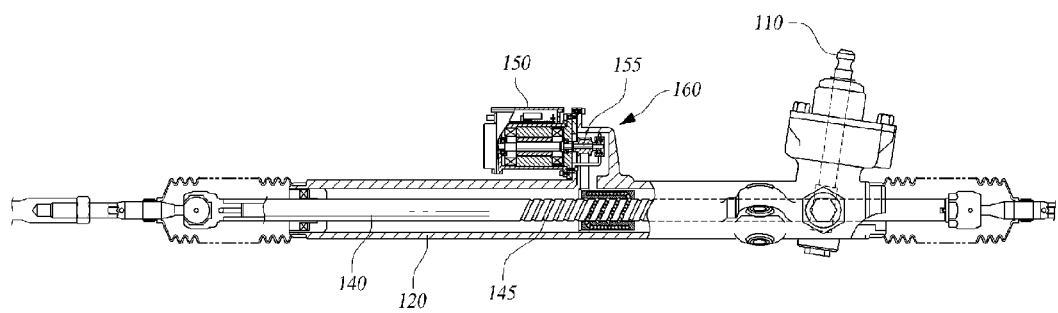
FIG. 1 is a partial cross-sectional view schematically illustrating a conventional rack-assist type electric power steering apparatus.
Figure 2:
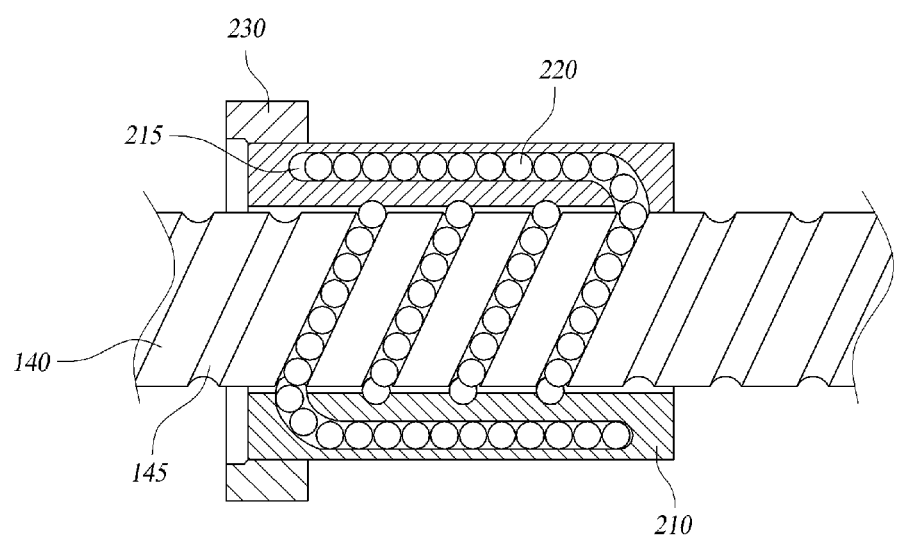
FIG. 2 is a cross-sectional view schematically illustrating a part of a conventional rack-assist type electric power steering apparatus.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

Figure 3:
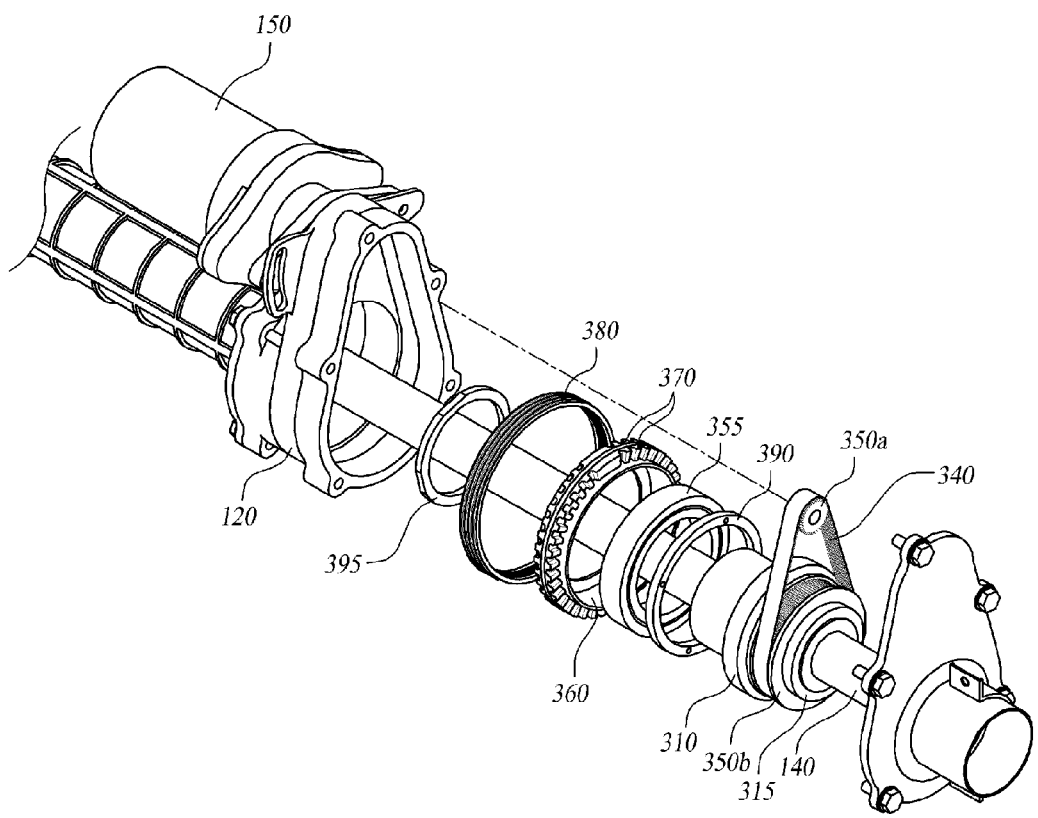
FIG. 3 is an exploded perspective view illustrating a part of a rack-assist type electric power steering apparatus according to a first exemplary embodiment of the present invention.
Figure 4:
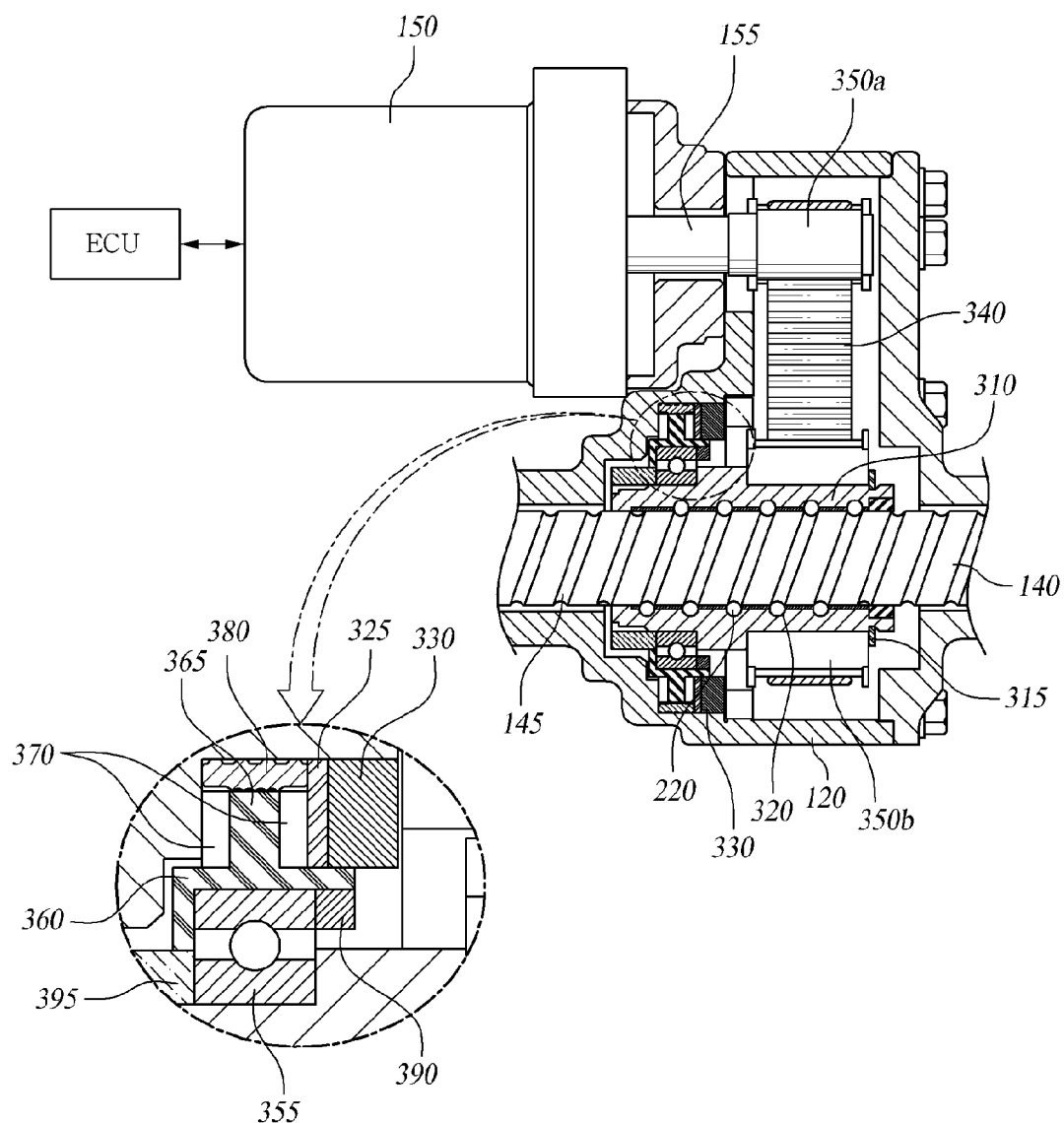
FIG. 4 is a cross-sectional view illustrating a rack-assist type electric power steering apparatus according to a first exemplary embodiment of the present invention.
Figure 5:
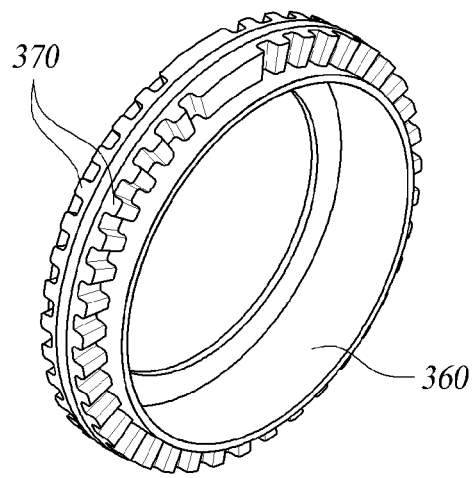
FIGS. 5 and 6 are a perspective view and a cross-sectional view illustrating an axial damper according to a first exemplary embodiment.
Figure 6:
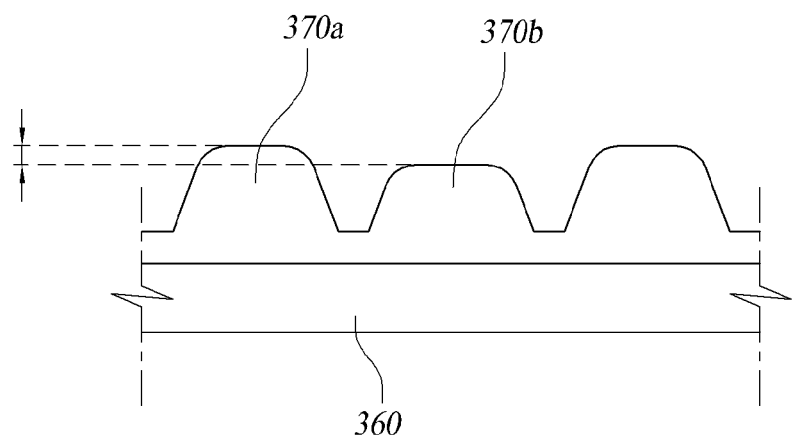
Figure 7:
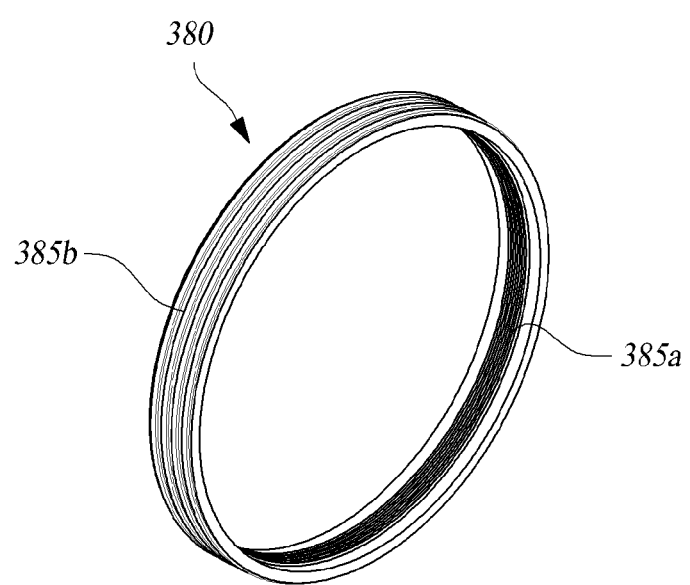
FIGS. 7 and 8 are a perspective view and a cross-sectional view illustrating a radial damper according to a first exemplary embodiment.
Figure 8:
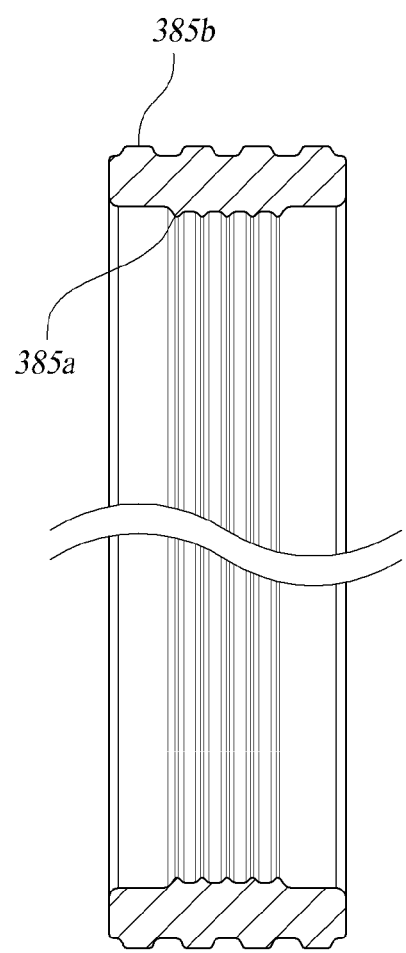

FIG. 3 is an exploded perspective view illustrating a part of a rack-assist type electric power steering apparatus according to a first exemplary embodiment of the present invention;

FIG. 4 is a cross-sectional view illustrating a rack-assist type electric power steering apparatus according to a first exemplary embodiment of the present invention; FIGS. 5 and 6 are a perspective view and a cross-sectional view illustrating an axial damper according to a first exemplary embodiment; and FIGS. 7 and 8 are a perspective view and a cross-sectional view illustrating a radial damper according to a first exemplary embodiment.

As shown in these drawings, a rack-assist type electric power steering apparatus according to a first exemplary embodiment of the present invention includes: a ball nut 310 which is rotated while being combined with a rack bar 140 through a ball 220, thereby sliding the rack bar 140; a bearing 355 which is mounted on the outer circumferential surface of the ball nut 310 to support the rotation; a connecting ring 360 combined between an outer wheel of the bearing 355 and a rack housing 120; and an axial damper 370 which is combined at both sides of the connecting ring 360 and is provided with lateral side projections 370a and 370b protruding in the direction of the central axis of the rack bar 140. The lateral side projections 370a and 370b of the axial damper 370 include a number of first side projections 370a whose outer lateral surfaces are tightly fitted in the rack housing 120, and a number of second side projections 370b spaced apart from the rack housing 120.

Also, a rack-assist type electric power steering apparatus according to another embodiment of the first exemplary embodiment includes: a ball nut 310 which is rotated while being combined with a rack bar 140 through a ball 220, thereby sliding the rack bar 140; a bearing 355 which is mounted on the outer circumferential surface of the ball nut 310 to support the rotation; a connecting ring 360 combined between an outer wheel of the bearing 355 and a rack housing 120; and a radial damper 380 which is combined between the outer circumferential surface of the connecting ring 360 and the rack housing 120.

Such a rack-assist type electric power steering apparatus includes a driving means and a driven means. The driving means includes an electric motor 150 controlled by an electronic control unit (ECU), a driving pulley 350a fixed at a shaft 155 of the electric motor 150, and a driving belt 340 wound on the driving pulley 350a.

Also, the driven means includes the ball nut 310 and a driven pulley 350b which are assembled. Herein, the ball nut 310 supports the rack bar 140 within the rack housing 120 surrounding the rack bar 140, and the driven pulley 350b is additionally formed on the outer circumferential surface of the boll nut 310.

The driving pulley 350a of the electric motor 150 and the driven pulley 350b of the rack bar 140 are disposed in parallel to each other. Around the driving pulley 350a and the driven pulley 350b, the driving belt 340 is wrapped, which transfers rotating power of the electric motor 150 to the rack bar 140, and moves the rack bar 140 to the left and to the right by the operation of the ball nut 310, thereby generating auxiliary steering power.

The ball nut 310 is rotated while being combined with the rack bar 140 through the ball, thereby sliding the rack bar 140 within the rack housing 120. At the outer circumferential surface of the ball nut 310, the bearing 355 supporting the rotation of the ball nut 310 is mounted.

The inner circumferential surface of the ball nut 310 and the outer circumferential surface of the rack bar 140 have a power transmission mechanism in such a manner that the rack bar 140 is slid in the axis direction while generating the auxiliary steering power. This power transmission mechanism includes: an outer circumferential screw thread 145 having a hemispherical cross section, which is spirally formed on the outer circumferential surface of the rack bar 140; the ball 220 inserted into the outer circumferential screw thread 145; and an inner circumferential screw thread 320 having a hemispherical cross section, which is spirally formed on the inner circumferential surface of the ball nut 310, and is corresponding to the outer circumferential screw thread 145.

The ball nut 310 is a hollow tube having the inner circumferential screw thread 320 formed on the inner circumferential surface thereof. The ball nut 310 has raised edges formed at both sides of the outer circumferential surface thereof, and the driven pulley 350b is provided at one side of the axis direction while being tightly fitted to the raised edges. Also, in one side end of the ball nut 310, a lock nut 315 screw-assembled with the outer circumferential surface of the ball nut is provided to fix the driven pulley.

Also, at the other side of the axis direction, the bearing 355 is tightly fitted to the raised edges, and is fixed by a lock nut 395 screw-assembled with the outer circumferential surface at the other side end of the ball nut 310.

Then, a washer 325 is fitted in such a manner that it can be tightly fitted in the axial damper 370 tightly fitted in one side of the inner circumferential surface of the rack housing 120, which is fixed by a lock screw 330 and performs a role of supporting the outer circumferential surface of the ball nut 310. The lock screw 330 is provided in such a manner that it can be screw-assembled with the rack housing 120.

The connecting ring 360 combined between the outer wheel of the bearing 355 and the rack housing 120 has a radial projection 365 which is designed to be combined with the axial damper 370 and the radial damper 380 (which will be described below) and support the bearing 355 in the axis direction and the radial direction, respectively, from the inside of the rack housing 120.

Herein, the axial damper 370 is combined to both surfaces of the projection 365 of the connecting ring 360, and is provided with lateral side projections 370a and 370b protruding in the direction of the central axis of the rack bar 140. The lateral side projections 370a and 370b of the axial damper 370 include a number of first side projections 370a whose outer lateral surfaces are tightly fitted in the rack housing 120, and a number of second side projections 370b spaced apart from the rack housing 120.

In other words, the first side projections 370a and the second side projections 370b are formed with a height difference therebetween, and are preferably alternately formed.

Accordingly, when the force generated by left/right sliding of the rack bar 140 within the rack housing 120 is applied to the ball nut 310, the axial damper 370 supports both side surfaces of the projection 365. Herein, the first side projections 370a subjected to a pressed load are firstly compressed and elastically deformed, and then in a case where the load is further applied, the second side projections 370b are compressed and elastically deformed. Thus, the elastic deformation is easier than that in a case where a projection is on the same level, which can reduce the pressed extent during initial assembly.

At the same time, at the other side to which the pressed load is not applied, the first side projections 370a and the second side projections 370b are elastically deformed in such a manner that they are restored to their original states.

Such an axial damper 370 is made of natural rubber (NR), nitrile butadiene rubber (NBR), chloroprene rubber (CR), ethylene propylene terpolymer (EPDM), fluoro elastomer (FPM), styrene butadiene rubber (SBR), chlorosulphonated polyethylene (CSM), or silicon to have weatherability and flexibility, and performs a role of damping a noise and a vibration.

Meanwhile, the radial damper 380 supporting the radial load transferred from the rack bar 140 is combined between the outer circumferential surface of the projection 365 of the connecting ring 360, and the rack housing 120. At the inner circumferential surface of the radial damper 380, a number of inner side projections 385a are formed which are spaced apart from each other, which absorb a load and a noise by being elastically deformed when the bearing 355 supporting the rotation of the ball nut 310 is applied with a radial load.

Also, at the outer circumferential surface of the radial damper 380, a number of outer side projections 385b are formed which are spaced apart from each other, which absorb, together with the inner side projections 385a, a radial load and a noise. The projected extent and the size of the inner side projections 385a are smaller than those of the outer side projections 385b.

Accordingly, when a small load is applied, the inner side projections absorb the load and the noise by being elastically deformed while the outer side projections firmly support the rack housing. When a load is further applied, the outer side projections are also elastically deformed while absorbing the load and the noise.

Such a radial damper is, like the axial damper, made of natural rubber (NR), nitrile butadiene rubber (NBR), chloroprene rubber (CR), ethylene propylene terpolymer (EPDM), fluoro elastomer (FPM), styrene butadine rubber (SBR), chlorosulphonated polyethylene (CSM), or silicon to have weatherability and flexibility, and performs a role of damping a noise and a vibration.

FIGS. 9 to 13 are cross-sectional views illustrating a rack-assist type electric power steering apparatus according to a second exemplary embodiment of the present invention.

As shown in the drawings, the rack-assist type electric power steering apparatus according to a second exemplary embodiment of the present invention includes: a ball nut 310 which is rotated while being combined with a rack bar 140 through a ball 220, thereby sliding the rack bar 140; a bearing 355 which is mounted on the outer circumferential surface of the ball nut 310 to support the rotation; and a housing damper 910 for absorbing a vibration and a noise in the axis direction and the radial direction of the rack bar 140, which is combined between the outer wheel of the bearing 355 and a rack housing 120.

The rack-assist type electric power steering apparatus according to the second exemplary embodiment of the present invention is the same as that of the first embodiment according to the present invention except for the housing damper 910 combined between the outer wheel of the bearing 355 and the rack housing 120. Accordingly, hereinafter, the differences between them will be described.

The housing damper 910 combined between the outer wheel of the bearing 355 and the rack housing 120 absorbs a vibration and a noise in the axis direction and the radial direction of the rack bar 140, and has various embodiments according to its structure and shape. Also, the housing damper 910 as described above is made of natural rubber (NR), nitrile butadiene rubber (NBR), chloroprene rubber (CR), ethylene propylene terpolymer (EPDM), fluoro elastomer (FPM), styrene butadiene rubber (SBR), chlorosulphonated polyethylene (CSM), or silicon to have weatherability and flexibility, and performs a role of damping a noise and a vibration.

Figure 9:
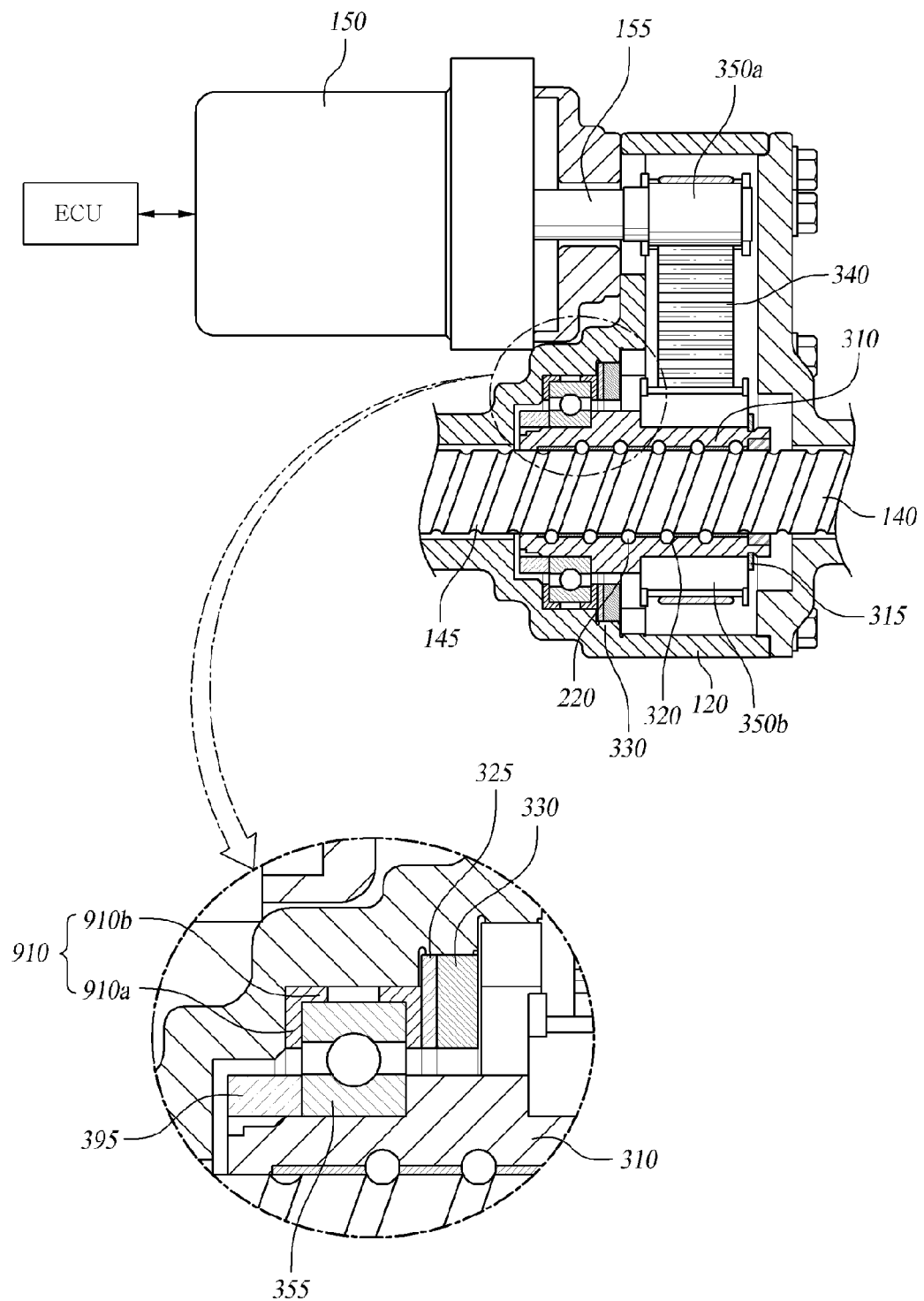
FIGS. 9 to 13 are cross-sectional views illustrating rack-assist type electric power steering apparatus according to a second exemplary embodiment of the present invention.

First, referring to FIG. 9, the housing damper 910 includes a first supporting portion 910a and a second supporting portion 910b which are integrally formed in such a manner that they are combined while surrounding the axis direction and the radial direction and the outer wheel of the bearing 355.

In other words, the first supporting portion 910a supporting and being combined with the axis direction of the outer wheel of the bearing 355, and the second supporting portion 910b supporting and being combined with the radial direction of the outer wheel of the bearing 355 are integrally curvedly formed, and thus are designed to absorb a vibration and a noise in the axis direction and the radial direction, generated by the rack bar 140's sliding caused by rotation of the ball nut 310.

Such a housing damper 910 may be separately formed. The housing damper 910 shown in FIGS. 10 to 13 includes a first damper 903 and a second damper 905 which are separately formed, which are designed to absorb a vibration and a noise in the axis direction and the radial direction of the outer wheel of the bearing 355, respectively.

Figure 10:
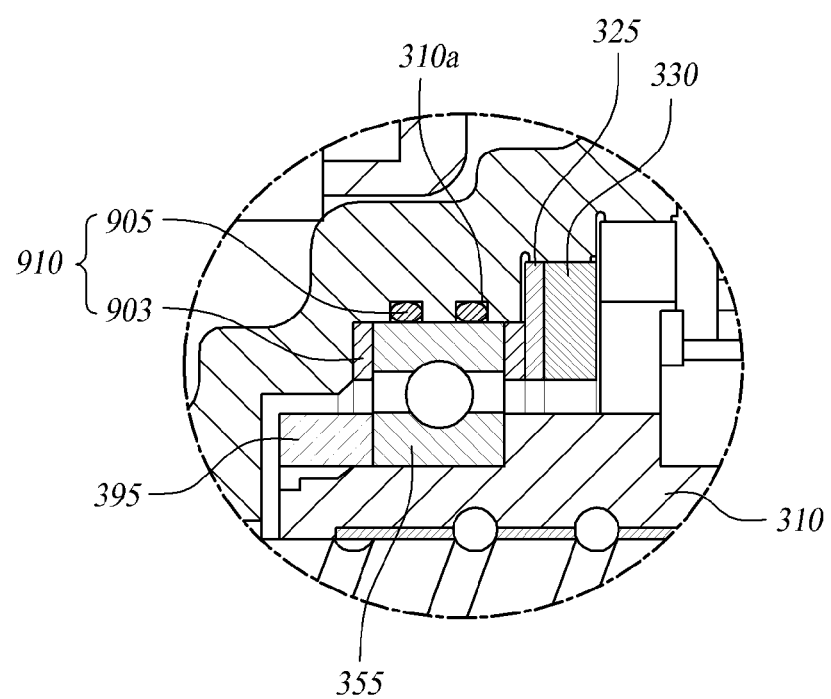

Referring to FIG. 10, the first damper 903 is combined at both sides of the axis direction of the outer wheel of the bearing 355, and the second damper 905 is combined with a fastening groove 310a which is formed as a recess in the rack housing 120 to support the radial direction of the outer wheel of the bearing 355.

Herein, one or more second dampers 905 may be combined. Thus, one or more fastening grooves 310a may be formed in the rack housing 120 to correspond to the second dampers, and thereby absorb a vibration and a noise transferred to the radial direction of the bearing 355.

Figure 11:
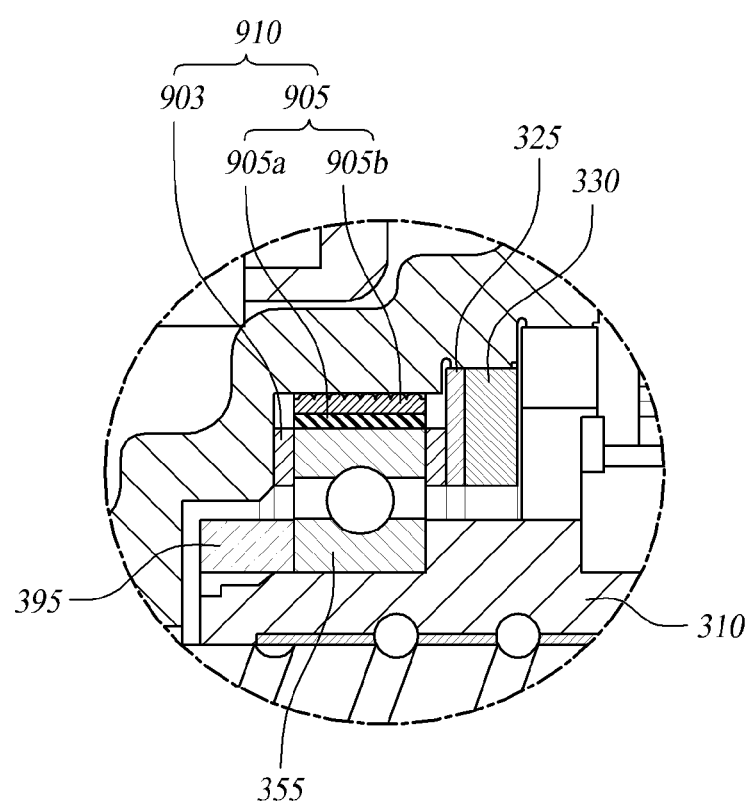

In FIG. 11, the first damper 903 is combined at both sides of the axis direction of the outer wheel of the bearing 355, and the second damper 905 is divided into a supporting part 905a and a damping part 905b. The supporting part 905a made of steel is press-combined with the outer wheel of the bearing 355, and the damping part 905b made of an elastic material is combined with the outer circumference side of the supporting part 905a.

However, the supporting part 905a and the damping part 905b may be integrally formed through injection molding. Also, the outer circumference side of the damping part 905b, that is, the surface in contact with the rack housing 120, is formed with an uneven portion so as to reduce the contact and friction with the rack housing 120.

Figure 12:
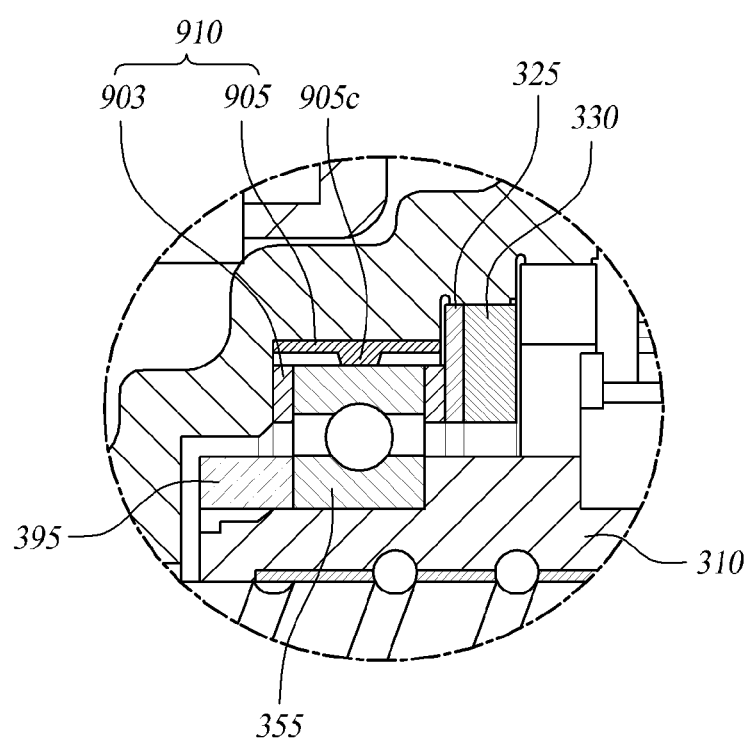

In FIG. 12, the first damper 903 is combined at both sides of the axis direction of the outer wheel of the bearing 355, and the second damper 905 is combined with the radial direction of the outer wheel of the bearing 355. The second damper 905 is formed with a projection 905c protruding to the outer wheel side of the bearing 355, and the projection 905c is designed to firstly absorb a vibration and a noise transferred from the ball nut 310 and the rack bar 140 through the bearing 355 by being elastically deformed.

Figure 13:
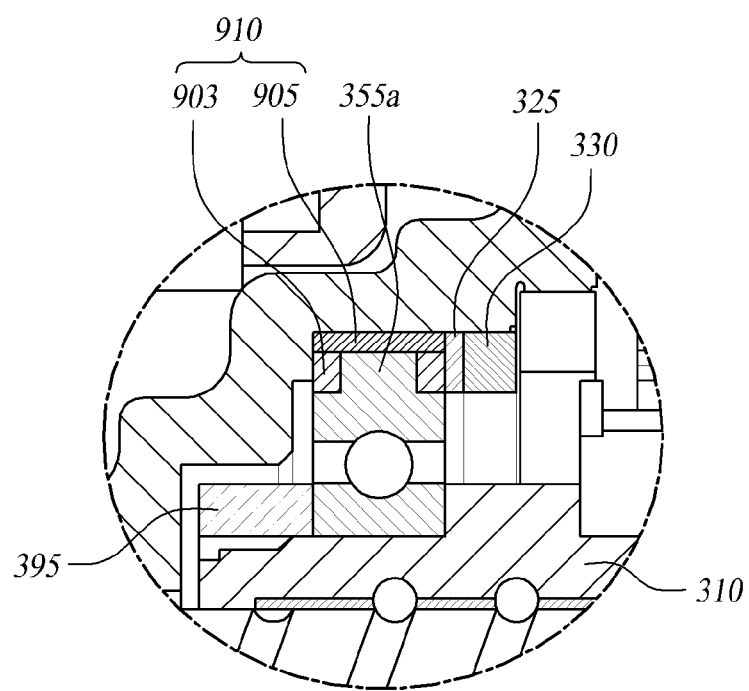

In FIG. 13, the first damper 903 is combined with both sides of the axis direction of the outer wheel of the bearing 355, and the second damper 905 is combined with the radial direction of the outer wheel of the bearing 355. At the outer wheel of the bearing 355, a projection 355a protruding in the radial direction is formed. At both sides of the projection 355a, the first damper 903 is combined, and in the radial direction, that is, at the outer circumference side of the first damper 903 and the projection 355a, the second damper 905 is combined, which absorb a vibration and a noise in the axis direction and in the radial direction transferred through the bearing 355 from the ball nut 310 and the rack bar 140.

However, the present invention is not limited to these embodiments. The first damper 903 and the second damper 905 may be integrally formed.

As described above, according to the present invention, when a ball nut slides a rack bar while rotating, a vibration and a noise in the axis direction and the radial direction, generated from the rack bar and a rack housing, are absorbed by a damper. This facilitates the operation of the ball nut and the rack bar, and reduces the vibration and the noise, thereby resulting in an effect for providing a comfortable steering feeling to a driver.

Even though it was described above that all of the components of an embodiment of the present invention are coupled as a single unit or coupled and operated as a single unit, the present invention is not limited to such an embodiment. That is, within the purpose of the present invention, all of the components may be selectively coupled and operated as one or more units.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A rack-assist type electric power steering apparatus comprising:
    a ball nut which is rotated while being combined with a rack bar through a ball, thereby sliding the rack bar;
    a bearing which is mounted on an outer circumferential surface of the ball nut to support rotation; a connecting ring combined between an outer wheel of the bearing and a rack housing; and
    an axial damper which is combined at both sides of the connecting ring and is provided with lateral side projections protruding in a direction of a central axis of the rack bar,
    wherein the lateral side projections comprise a number of first side projections, and a number of second side projections, and
    wherein the connecting ring has a radial projection, and the axial damper is combined at both sides of the projection.

2. The rack-assist type electric power steering apparatus as claimed in claim 1, wherein between an outer circumferential surface of a projection of the connecting ring, and the rack housing, a radial damper is combined.

3. The rack-assist type electric power steering apparatus as claimed in claim 1, wherein the first side projections have outer lateral surfaces tightly fitted in the rack housing, and the second side projections have outer lateral surfaces spaced apart from the rack housing, wherein the first side projections and the second side projections are formed with a height difference therebetween in an axis direction.

4. The rack-assist type electric power steering apparatus as claimed in claim 3, wherein the first side projections and the second side projections are alternately formed.

5. A rack-assist type electric power steering apparatus comprising:
- a ball nut which is rotated while being combined with a rack bar through a ball, thereby sliding the rack bar;
- a bearing which is mounted on an outer circumferential surface of the ball nut to support rotation;
- a connecting ring combined between an outer wheel of the bearing and a rack housing; and
- an axial damper which is combined at both sides of the connecting ring and is provided with lateral side projections protruding in a direction of a central axis of the rack bar,
- wherein the lateral side projections comprise a number of first side projections, and a number of second side projections,
- wherein between an outer circumferential surface of a projection of the connecting ring, and the rack housing, a radial damper is combined, and
- wherein an inner circumferential surface of the radial damper is provided with a number of inner side projections which are spaced apart from each other.

6. The rack-assist type electric power steering apparatus as claimed in claim 2 or 5, wherein an outer circumferential surface of the radial damper is provided with a number of outer side projections which are spaced apart from each other.

* * * * *